United States Patent [19]

Kunz

[11] 4,064,794
[45] Dec. 27, 1977

[54] APPARATUS FOR SKINNING OR PEELING PRODUCE SUCH AS FRUITS AND VEGETABLES

[76] Inventor: Paul Kunz, 5419) Doettesfeld, Germany

[21] Appl. No.: 557,633

[22] Filed: Mar. 12, 1975

Related U.S. Application Data

[62] Division of Ser. No. 469,613, May 13, 1974, Pat. No. 3,959,506.

[30] Foreign Application Priority Data

Dec. 6, 1973   Germany .............................. 2360886
May 18, 1973   Germany .............................. 2325293

[51] Int. Cl.² .............................................. F16J 13/02
[52] U.S. Cl. .......................................... 99/474; 21/95;
   99/516; 99/584; 99/DIG. 8; 220/346
[58] Field of Search ................. 99/467, 475, 483, 484,
   99/584, 474, 516, DIG. 8; 21/95; 426/482;
   292/136, 238, 25; 220/346

[56] References Cited

U.S. PATENT DOCUMENTS

| 1,325,847 | 12/1919 | Horst ...................... 426/482 |
| 2,638,137 | 5/1953 | DeBack ...................... 99/475 |
| 2,676,632 | 4/1957 | Hook et al. .................. 99/584 X |
| 3,164,181 | 1/1965 | Kunz ......................... 21/95 X |
| 3,623,627 | 11/1971 | Bolton ....................... 220/346 X |
| 3,844,597 | 10/1974 | Elrod et al. ................. 292/136 X |
| 3,853,049 | 12/1974 | Wilkerson .................... 99/584 |

FOREIGN PATENT DOCUMENTS

2,032,796   10/1971   Germany .............................. 99/584

Primary Examiner—Richard E. Aegerter
Assistant Examiner—Stuart S. Levy
Attorney, Agent, or Firm—W. G. Fasse; W. W. Roberts

[57] ABSTRACT

The present apparatus for skinning or peeling of produce comprises a rotatably mounted pressure vessel having a cover operable from within the vessel for sealing the vessel. The cover is pressure operated and permitted to fall open under the force of gravity upon pressure release. A pivoted latching pawl is provided in the pressure vessel for engaging the cover to hold it open. The pawl is also gravity operated to latch the cover in an open position. In the process for skinning or peeling produce, the pressure vessel is loaded with the produce, sealed and steam is introduced therein to rapidly increase the pressure and temperature within the vessel sufficiently so that a layer under the skin of the produce will come to a boil in response to pressure release. The pressure is maintained for a given period until the layer of the produce under its skin is sufficiently heated. Then the pressure is reduced to atmospheric pressure in either one or two steps, whereby said boiling occurs and the skin is removed thereby.

18 Claims, 4 Drawing Figures

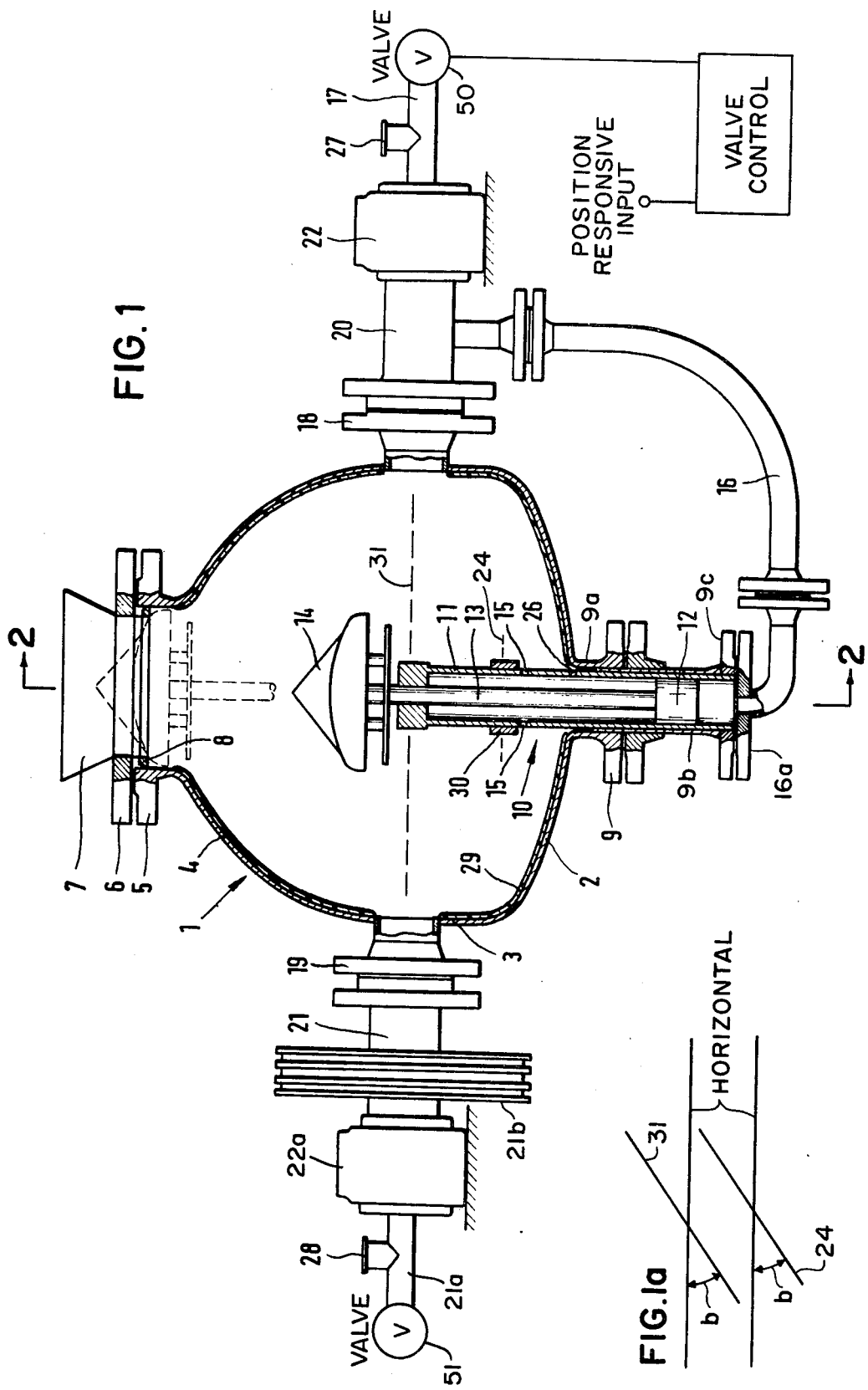

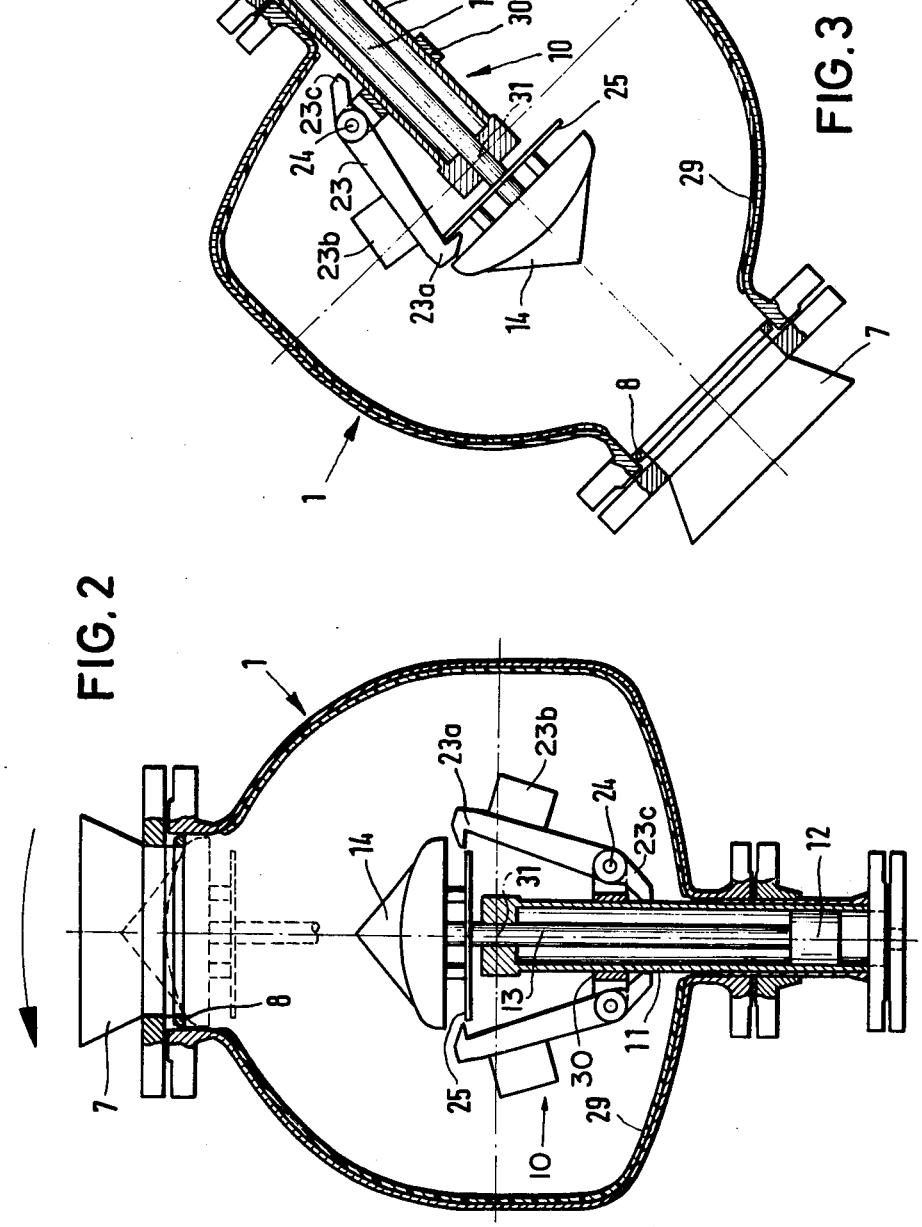

APPARATUS FOR SKINNING OR PEELING PRODUCE SUCH AS FRUITS AND VEGETABLES

This is a divisional of application Ser. No. 469,613 filed May 13, 1974 now U.S. Pat. No. 3,959,506.

BACKGROUND OF THE INVENTION:

This invention relates to a process for skinning or peeling produce, such as tomatoes and peaches and similar fruits, in which the layer of the produce directly under its skin is quickly heated by steam. The invention is also directed to an apparatus for performing the method.

German Patent Publication (Offenlegungsschrift) No. 2,060,447 discloses a process for peeling tomatoes in which the tomatoes are fed to a steamer. Steam is discharged from jets into the steamer at a temperature of about 360° to 400° C and at a pressure of up to 3 atmospheres, whereby the skins of the tomatoes are rapidly heated, so that the water directly under the skin of the tomatoes is brought to a boil. This boiling tears the skins, so that a part of the skin falls off the body of the tomatoes. As described in said publication, the known method has the disadvantage that only a part of the skin falls off. Hence manual completion of the peeling of the tomatoes is necessary following the steam treatment in order to remove the remainder of the skin. In addition, the steam acts in a nonuniform manner on the tomatoes, so that the tomatoes are partly overheated and partly underheated. Besides, this process requires the use of equipment to superheat the steam and having sufficient capacity. The cost of such equipment is rather high.

This publication also discloses a process in which the tomatoes are heated to a temperature of about 60° to 100° C and then put into a vacuum of less than 300 mm of Mercury. Consequently, the skins explosively burst open due to the rapid boiling of the liquid under the skin. This process has the disadvantage that it requires the use of vacuum equipment. In addition, in said further known method the treatment of the surface area of the tomatoes is also not uniform and it is also necessary following the vacuum treatment to manually handle at least those tomatoes to which skin still partially adheres in order to completely remove the skins.

It is also known to remove the skins from potatoes or similar hard produce by means of a steam peeler, as described in German Pat. No. 1,234,690 and in U.S. Pat. No. 3,164,181. In the process described in these publications, the pressure within a pressure vessel containing the potatoes is brought to a pressure of about 7 atmospheres (gauge) within about 10 seconds. The potatoes are exposed to this pressure for about 45 seconds while rotating the pressure vessel. The pressure is then released and the potatoes are removed from the pressure vessel. The process is limited, however, for peeling only relatively hard produce, such as potatoes.

The above mentioned German Pat. No. 1,234,690 discloses a peeling apparatus which includes a pressure vessel with a hydraulically operated device for opening and closing the vessel. A source of pressure is provided to operate the hydraulic arrangement. A pressure cylinder is mounted inside the pressure vessel. A piston in the cylinder is connected through a piston rod to a cover to open and close the pressure vessel from within. The cover is held in the open position by means of a spring. The pressure vessel, the hydraulically operated opening and closing device and the cover are supported for rotation as a unit. The pressure cylinder is connected to said pressure source by means of a connecting conduit. The pressure cylinder is provided with discharge openings in its cylinder wall. These openings are arranged so that the pressure outlets are uncovered by the piston only when the cover is closed.

The spring employed in this arrangement is subject to a substantial tension, and is hence subject to a very large wear and tear. In addition, the cover is not completely opened as soon as the spring force slackens. In addition, the arrangement has the disadvantage that the cover may be closed by switching on of the pressure in any position of the system. Therefore, the operator must continually pay attention that the pressure is not accidentally switched on when tending the pressure vessel, for example, for refilling.

OBJECTS OF THE INVENTION

In view of the above it is the aim of the invention to achieve the following objects singly or in combination:

to provide a process which enables the skinning or peeling of produce such as vegetables or fruits, and especially soft fruits, such as tomatoes and peaches;

to provide a process for gently peeling soft fruits and vegetables by means of steam, in which the fruits or vegetables are not damaged and in which it is not necessary to provide means for super-heating steam or for producing a vacuum;

to provide an apparatus for steaming produce, especially soft produce such as tomatoes and peaches, which apparatus does not have the disadvantages of the prior art;

to provide an apparatus for skinning soft fruits and vegetables such as peaches and tomatoes wherein the pressure within the pressure vessel may be rapidly brought to a desired pressure and temperature, the pressure vessel may be rotated, and wherein the opening and closing arrangement for the pressure vessel does not require the use of springs; and to provide means in a pressure vessel for skinning fruits and vegetables, whereby the cover of the vessel may be latched in an open position without the use of springs and so as to avoid an accidental closing.

SUMMARY OF THE INVENTION

In accordance with the invention there is provided a process for peeling fruits and vegetables, especially peaches and tomatoes, in which the layer directly under the skin of the fruit or vegetable is briefly heated by means of steam. In this process the fruits or vegetables are loaded into a pressure vessel which rotates during the entire process. Hot, wet steam is introduced into the pressure vessel, so that a relatively high pressure is built up in the vessel in a matter of seconds. This pressure is maintained until the layer under the skin of the fruit or vegetable is heated to such an extent that boiling under the skin will result in response to pressure release for which purpose the pressure is rapidly released from the pressure vessel.

The invention further provides an apparatus for skinning produce, comprising a rotatably supported pressure vessel having a cover operated from within the vessel to open the cover inwardly. A hydraulic apparatus is employed for controlling the opening and closing of the cover. The apparatus further comprises a latching pawl that is operable under the force of gravity to hold the cover in an open position. The latching pawl is pivotally mounted for tilting about an axis that extends substantially parallel to the rotational axis of the pressure vessel. The center of gravity of the latching lever lies between its pivoting axis and a hook provided at the opposite end of the lever. A weight may be provided, preferably as an integral part of the latching pawl adjacent to its hook end. The latching pawl is so mounted that its hook engages the cover in the completely open position thereof at a first rotated position of the pressure vessel, to thereby hold the cover in its opened position until the pressure vessel reaches a second rotational position in which the cover is held open by its own weight. In the latter position of the cover, the latching pawl is released from the cover under the force of gravity. Preferably, the longitudinal axis of the pawl and the longitudinal axis of the pressure vessel each include with the horizontal an angle of less than 45°.

The arrangement of the present invention enables the skinning of fruits and vegetables, especially soft fruits, such as tomatoes or peaches, without difficulty and without adversely affecting the quality of the fruit or vegetable.

According to the invention there is further provided an opening and closing device for a vessel, especially a pressure vessel having an inwardly opening cover operable by a piston cylinder arrangement. The rotational axis of the vessel is arranged in such a manner that the cover will assume the open position in response to gravity when the vessel reaches a predetermined position. A catch pawl operable by gravity and in response to predetermined rotational positions of the vessel is arranged to pivot about an axis extending substantially in parallel to the rotational axis of the vessel. The pawl is provided with a catch hook at its end opposite the pivot end thereof. The pawl has its center of gravity between its pivot end and its hook end, preferably close to the hook end. The catch hook engages the cover in a first rotational position of the vessel and stays engaged with the cover to hold it securely in its open position until the vessel reaches another rotational position in which the cover is held open by its own weight. The pawl may be provided with stop means for limiting the movement of the pawl in the disengaging direction.

BRIEF FIGURE DESCRIPTION:

In order that the invention may be clearly understood, it will now be described, by way of example, with reference to the accompanying drawings, wherein:

FIG. 1 is a side view of the present system, partially in section through the pressure vessel in accordance with the invention, whereby the section extends through the longitudinal axis of the vessel and the rotational axis of the vessel extends substantially horizontally;

FIG. 1a illustrates schematically the preferred location of the rotational axis of the pressure vessel relative to the horizontal;

FIG. 2 is a partial sectional view similar to that of FIG. 1 through the vessel taken along section line 2—2 in FIG. 1, whereby the section plane is rotated by 90° relative to FIG. 1; and FIG. 3 is a sectional view through the vessel illustrated in FIG. 2, disposed at a different angular position, whereby the cover is latched in its open position and wherein as in FIG. 2, the cover and the latching pawl are not shown in section for the sake of clarity.

DETAILED DESCRIPTION OF EXAMPLE EMBODIMENTS

Referring now to FIG. 1 there is illustrated an apparatus for performing the method of skinning or peeling produce, such as fruits and vegetables in accordance with the invention. The apparatus of the invention comprises a pressure vessel 1 shown in section along its longitudinal axis in FIG. 1. The pressure vessel 1 has a generally rounded bottom section 2, a substantially cylindrical central section 3, and a top section 4 formed generally somewhat as a truncated conical shape which curves into the cylindrical portion. The pressure vessel may be formed by any conventional technique, for example by forming the three separate sections and then welding them together.

The smaller diameter end of the top section 4 defines preferably, but not necessarily, a circular opening in the top of the pressure vessel 1, as illustrated in FIG. 1. A flange 5 is welded to the opening. A ring 6 is affixed to the flange coaxially therewith, for example, by bolting. A hopper or funnel 7 is connected, for example, by welding to the outside of the ring 6 to facilitate loading of produce into the pressure vessel. A sealing ring 8 is also secured to the flange 5 at its inner periphery to provide a seal for the pressure vessel, as will be described below.

An aperture is provided at the center of the bottom section 2 and a flange 9 is secured to the bottom of the pressure vessel preferably through a neck 9a extending between the flange 9 and the bottom of the pressure vessel.

A device 10 for opening and closing the opening in the pressure vessel extends through the flange 9 and through the neck into the vessel. This device 10 comprises a hollow cylinder 11 extending coaxially with the longitudinal axis of the pressure vessel and into the pressure vessel while a portion of the cylinder 11 extends outside of the pressure vessel. A piston 12 is slidably positioned within the cylinder 11 and carries a piston rod 13 extending upwardly through an aperture in the upper end wall of the cylinder 11. A closure member or cover 14 is secured to the upper end of the piston rod 13, so that in an upper position of the piston 12, the cover 14 coacts with the sealing ring 8 to seal the pressure vessel, as illustrated in dotted lines in the drawing.

Outlet openings 15 are provided in the wall of the hollow cylinder 11 at such a height that a pressure medium in the cylinder 11 below the piston 12 is exhausted into the pressure vessel at the instant when the cover 14 sealingly engages the sealing ring 8, since at that time the piston 12 clears the openings 15. A pressure conduit 16 is connected to the lower end of the cylinder 11 by any conventional means. For example, as illustrated in FIG. 1, an additional flanged member 9b may be bolted to the flange 9 to surround the lower end of the cylinder 11 to securely hold the cylinder 11 in position. A flange 16a at the end of the conduit 16 is bolted or otherwise affixed to a lower flange 9c on the member 9b. The conduit 16 is connected to a pressure supply line 17 by means more fully described below. The pressure vessel 1 is supported for rotation about an axis 31 (FIG. 2) extending transversely to the longitudinal axis of the pressure vessel illustrated in FIG. 1. For this purpose, pipe connections 18, 19 are welded or otherwise suitably affixed to the sides of the pressure vessel to extend axially thereof, the axis of the pipe connections 18, 19 extending through the center of gravity of the pressure vessel. The pipe connections 18, 19 are affixed to hollow support shafts 20, 21, for example by means of suitable flanges. The hollow support shafts 20, 21 are journaled in bearings, for example sleeve bearings 22. The conduit 16 is connected to the hollow support shaft 20. A suitable pressure outlet opening (not shown) is provided inside of the pipe connection 19, for release of pressure from the pressure vessel 1.

The pressure supply line 17 extends into the hollow support shaft 20 and is supported inside of the sleeve bearing 22. The pressure supply line 17 is sealed, for example, by means of a stuffing box or oil seal ring in the sleeve bearing or journal 22. A steam outlet 21a similarly extends into the hollow support shaft 21 through the journal 22a, and is sealed in a similar manner by means of a stuffing box or sealing ring.

In addition to the above described inlets and outlets to the pressure vessel 1, further pipe connections may be provided on the pressure vessel for connecting thereto a venting valve, a safety valve, and a manometer.

The pressure vessel 1 may be rotated by any conventional means, for example, by a motor (not shown) coupled by driving belts or other transmission means to a pulley 21b secured to the hollow support shaft 21, since the entire pressure vessel assembly including the conduit 16 is rotatably supported in the journals 22 and 22a.

Referring now to FIGS. 2 and 3, which illustrate different positions of the pressure vessel 1 in section in a plane transverse to the plane of FIG. 1, a latching pawl 23 is provided in the pressure vessel as part of the opening and closing device 10. The latching pawl 23 is rotatably supported on an axis 24 extending in parallel to the axis 31 of rotation of the pressure vessel 1. The axis of the latching pawl may be provided in the form of a suitable shaft affixed, by means of a metal band 30 to the outside wall of the hollow cylinder 11. The metal band 30 may, for example, be screwed to the hollow cylinder. Alternatively, the pivotal support may be affixed to the hollow cylinder 11 by any other conventional means, for example, by welding.

The latching pawl 23 is pivotally supported by its axis 24 and is positioned so that a hook 2a on the end of the lever can extend into locking engagement with the cover 14, as illustrated in FIG. 3. To this end, the center of gravity of the pawl 23 lies between the hook 23a and the axis 24, so that the latching pawl 23 swings about its axis under the force of gravity, as the pressure vessel rotates or tilts counterclockwise in the direction of the arrow, as illustrated in FIG. 2. The force of gravity on the latching pawl 23 forces the hook 23a into engagement with the cover 14 as soon as the pressure vessel has been rotated by a certain angle. If desired, two latching pawls may be provided mirror-symmetrically to each other, whereby tilting in either direction would result in the locking of the cover 14. In the upright position of the pressure vessel, as shown in FIG. 2 and in the absence of any pressure applied to the cylinder 11, the cover 14 is free to fall from the opening in the pressure vessel under the force of gravity. The cover is not latched in this position since the force of gravity pulls the latching pawl out of engagement with the cover 14. An extension 23c of the pawl 23 limits the opening movement of the pawl 23.

In order to facilitate the latching of the cover 14 by the latching pawl, a suitable shoulder 25 is affixed to the inside of the cover and positioned to be engaged by the latching pawl 23. The latching of the shoulder 25 by the latching hook 23a is a result, as above discussed, of the force of gravity acting on the latching pawl 23. Once the hook 23a has engaged the shoulder 25, a restraint on its release results from friction between these members. Further, when the pressure vessel has been rotated, for example, to the position shown in FIG. 3, gravity forces acting on the cover 14 also serve to tighten the latching effect between the hook 23a and the shoulder 25. This latching effect thus will continue until the pressure vessel has rotated to a position, for example, as shown in FIG. 2, in which gravity acting on the pawl 23 forces the latching pawl out of engagement with the shoulder 25. In order to enhance the action of gravity on the latching pawl 23, a suitable weight 23b may be affixed to the pawl 23. To facilitate the tilting movement of the pawl 23, the angle "b" between the horizontal and the journal axis 24 of the pawl 23 should be less than 45°. The respective angle "b" between the horizontal and the rotational axis 31 of vessel 1 would correspondingly be less than 45° where the axes 24 and 31 extend in parallel to each other as they preferably should, see FIG. 1a.

For the operation of the system, a suitable steam inlet valve 50 may be provided in the pressure supply line 17, and a suitable steam outlet valve 51 may be provided in the outlet connection 21a.

FIGS. 1 and 2 show the pressure vessel in the rest position. At the start of a cycle of operation, the steam inlet valve 50 is closed and the steam outlet valve 51 is open. Consequently, no pressure is applied to the piston 12 and the cover 14 therefore takes up its lowermost position under the force of gravity, so that the pressure vessel is completely open. Simultaneously, also under the force of gravity, the pawl 23 is out of engagement with the shoulder 25. In this position, the pressure vessel 1 can be loaded through the funnel 7 with produce to be skinned.

By opening of the steam inlet valve 50 and simultaneously closing of the steam outlet valve 51 and the safety valve (not shown), the pressure medium, i.e. the steam, enters the pressure conduit 16 through the pressure supply line 17 and through the hollow support shaft 20, whereby a lifting force is applied to the piston 12, and consequently the piston rod 13 urges the cover 14 upwardly into sealing engagement with the sealing ring 8, as shown in the dashed position thereby sealing the pressure vessel. The diameter of the piston 12 is selected so that the pressure applied to the piston 12 exerts the necessary lifting force on the cover 14. The length of the piston rod 13 is selected so that the cover 14 engages the sealing ring 8 when the upper ports 15 in the cylinder are uncovered by the piston, whereby the increasing pressure within the vessel firmly holds the cover 14 in sealing engagement with the sealing ring 8. The pressure vessel is now ready for the desired treatment of the produce in the pressure vessel by rotating the pressure vessel and the opening and closing arrangement 10 about the axis 31 in the counterclockwise direction shown by the arrow in FIG. 2.

After the end of the treatment, the steam inlet valve 50 is closed and the steam outlet valve 51 and any safety valves are opened until the pressure in the pressure vessel approaches almost atmospheric pressure. The pressure vessel still rotates and as soon as the pressure vessel reaches the upright position, as illustrated in FIG. 2, the cover 14 drops down under the force of gravity to its fully opened position, i.e. from the position shown in dashed lines to the position shown in solid lines.

Upon further counterclockwise rotation of the pressure vessel 1 from the position shown in FIG. 2, the latching pawl 23 rotates about its axis under the force of gravity and thereby engages with the shoulder 25 as illustrated in FIG. 3. The force holding the cover 14 in the fully open position by means of the latch pawl 23 is increased by the weight of the cover acting on the pawl. The pawl can release the shoulder 25 only when the cover does not exert any force, that is, when the cover is not urged by gravity toward the opening which is the case in the position of FIG. 2.

The above described apparatus is particularly useful in the skinning of produce such as vegetables and fruits, especially tomatoes and peaches, whereby the skinning process in accordance with the invention is performed as follows. The washed produce is first filled into the pressure vessel by way of the hopper or funnel 7. The cover 14 is closed as described above. Within about 2 seconds the pressure within the vessel is increased to about 10 atmospheres (gauge) by introducing a suitable pressure medium. The temperature of the steam introduced into the pressure vessel is about 180° C. The high pressure is maintained within the pressure vessel until the temperature of the layer of fruit directly under the skin reaches about 180° C. Depending upon the type of fruit, the proper temperature is reached within about 5 to 20 seconds.

Since the rotation of the pressure vessel about the axis 31 starts as soon as the cover 14 is closed, the produce to be skinned is in constant movement from the time the steam is introduced into the pressure vessel and during the whole treatment time. Consequently, an even heating of the entire surface area of the produce is obtained. After the termination of the time for the steam treatment, the steam inlet valve is closed and the steam outlet valve and safety valve are opened. The rotation of the vessel, however, still continues. Due the the resulting sharp decrease in the pressure, the overheated layers under the skin of the produce to be skinned immediately begin to boil, and the skins are completely pealed off or popped off the produce. The uniform treatment of the produce over their entire surface areas is assured because in this stage of the process the rotation of the pressure vessel and the consequent movement of the procude is continued. Any remaining skin portions of the produce are removed due to the movement of the produce against one another and against the inner wall of the pressure vessel.

In a modification of the above described arrangement, as illustrated in FIG. 1, the hollow cylinder 11, in addition to being provided with the openings 15, is also provided with a smaller opening 26. The opening 26 also extends through the wall of the cylinder into the pressure vessel. The opening 26 is positioned so that it is uncovered by the piston 12 even before the openings 15 and thus prior to closing the cover 14. By this means a desired amount of steam may be introduced into the pressure vessel before the complete closing of the pressure vessel by the cover 14. The steam introduced in the pressure vessel through the opening 26 drives out unwarmed air from the pressure vessel through the opening to be closed by the cover 14. The produce thereby becomes completely surrounded by the steam whereby an essentially better and more uniform heating of the produce is obtained.

In still another modification of the above described process for skinning produce, a sufficient amount of hot water is introduced into the pressure vessel, before the loading of the produce, to just cover the bottom of the pressure vessel with the water. The water can be introduced into the pressure vessel, for example, by way of suitable filling openings (not shown) in the pressure vessel, or alternatively by way of the connections 27, 28 through the pressure inlet or pressure outlet conduits, as illustrated in FIG. 1. If desired, the water may be introduced into the pressure vessel simultaneously with the produce. The water in the pressure vessel provides the advantage that the produce is handled more carefully, since any bouncing of the produce is dampened by the water. Simultaneously, the rotation of the pressure vessel with water therein during the treatment of the produce results in more moisture surrounding the produce than when no water is employed, whereby the heat conduction is improved, and thus a more uniform treatment of the produce is accomplished. In addition, this modification of the invention shortens the treatment time due to the improved heating of the produce.

In the above described process for skinning produce, the pressure is normally completely reduced within about 5 to 7 seconds. In another embodiment of the invention, the pressure is reduced in two steps. In the first step, after the termination of the necessary time for steam treatment, the pressure is reduced to about 1/5th to 1/10th of the maximum pressure (peeling pressure). The rotation of the pressure vessel then continues for about one or at the most for three revolutions. A complete rotation of the pressure vessel takes about 5 to 10 seconds. The pressure reduction in the first step is sufficient to cause the boiling of the overheated layer under the skin to the same extent as in the above described modification with a single step pressure reduction and the skin peels off or pops off as before. The remaining pressure of about 1 to 2 atmospheres (gauge) is sufficient to hold the cover 14 in its closed position, so that the pressure vessel can still rotate completely around its axis 31 without the cover 14 falling to its fully open position under the force of gravity. Any remains of skin on the produce is thereby completely removed as a result of the rubbing of the fruits against one another due to the further rotation of the pressure vessel. One or two further revolutions of the pessure vessel are suitable to achieve this effect. In the second step in accordance with this modification of the invention, the pressure is completely released so that the cover 14 can move to its fully open position as shown at FIGS. 1 and 2. Finally, the skinned fruit is emptied from the pressure vessel.

In order to enable the use of the apparatus illustrated in the drawings in the skinning of the produce in a two step process as above described, suitable control arrangements may be provided for the valves. Such control arrangements may be conventional and need no further explanation here.

In a still further embodiment of the invention, a second latching pawl may be mounted on the cylinder 11, in a mirror-symmetrical manner relative to lever 23 and relative to the longitudinal axis of the vessel. In other words, what is shown to the right of the cylinder 11 in FIG. 2, would also appear to the left of cylinder 11. The latching pawl on the left side of the cylinder 11 may have the same shape and be mounted in the same manner as the latching pawl 23. The two latching pawls function in similar manner, so that the second latching pawl is operative if the pressure vessel is turned in the clockwise direction.

The use of a second axially symmetrically arranged latching pawl insures that the cover 14 is only released when the pressure vessel, and consequently the closing arrangement are substantially in the vertical position as illustrated in FIG. 2.

In addition, an arrangement can be provided for stopping the movement of the latching pawl or pawls for a given time, so that the pawl means may be stopped either in its "open" position as shown in FIG. 2, or in its cover holding position as illustrated in FIG. 3. The arrangement for stopping the movement of the latching pawl means may advantageously be designed so that the latching pawl remains locked in the cover holding position following the opening of the cover 14 under the force of gravity, and after the pawl first engages the shoulder 25. Such locking of the latching pawl in a fixed position preferably continues until it is released in response to a signal indicating that the steam inlet valve 50 is to be opened. The opening of the steam inlet valve 50 is delayed, following this signal, until the pressure vessel has turned sufficiently far that the latching pawl returns to its open position under the force of gravity, as illustrated in FIG. 2.

In order to prevent the opening of the steam inlet valve at any time when the latching pawl 23 engages the shoulder 25, and thus to avoid loosening of the hook 23a due to gravity and while the pressure is exerted on the piston 12, control means may be provided which permit the opening of the steam inlet valve 50 only if the pressure vessel is nearly in its vertical position, with its opening directed upwardly, so that the latching lever 23 has released the cover. For this purpose, a control means, such as a switch (not shown) but responsive to the position of the vessel 1 or to the position of the pawl 23, may be provided for controlling the operating of the steam inlet valve 50 in a manner known as such. If desired, even the movement of the pawl or pawls 23 may be controlled by a position responsive switch or the like. For example, electromagnets could be connected to the upper end of the cylinder 11 for actuating the pawl or pawls 23. In the alternative the pawl or pawls could also be actuated by pneumatic or hydraulic means responsive to the position of the vessel 1.

In the apparatus for opening and closing the pressure vessel in accordance with the invention, no spring is required for controlling the operation of the cover. The invention employs a latching pawl or pawls 23 instead of a spring, so that the cover may be continually held completely open, whereby the pressure vessel may be emptied of the skinned produce without any trouble.

In a further embodiment of the invention, the inner wall of the pressure vessel is lined with a soft layer 29. This layer dampens the bouncing of the produce on the wall of the pressure vessel when the produce is loaded into the pressure vessel. A plastic material may be employed for lining the wall of the pressure vessel. For example, a plastic material traded under the trademark "HOSTAFLON" may be employed. Although the cover latching arrangement disclosed herein has been described with reference to a peeling apparatus, it will be appreciated that the present latching arrangement may be employed in any vessel of the general construction shown. For example, the vessel could be a cleaning drum or the like. Thus, it is to be understood, that it is intended to cover all modifications and equivalents within the scope of the appended claims.

What is claimed is:

1. A rotatably supported pressure vessel comprising an opening, sealing cover means for closing said opening, said sealing cover means including pawl catch means, opening and closing means located at least partly inside said pressure vessel, said opening and closing means including piston cylinder means arranged for operating said sealing cover means, means mounting said sealing cover means to said piston cylinder means so that the sealing means are movable under the force of gravity towards and away from said opening, said opening and closing means further comprising latching pawl means and pivot means pivotally mounting said latching pawl means within said pressure vessel, said latching pawl means being so weighted that upon rotational movement of said pressure vessel said latching pawl means is movable in response to gravity about said pivot means into a first position engaging said pawl catch means and into a second position disengaging said pawl catch means, said pressure vessel being adapted to assume a first angular position in which said latching pawl means is moving from its disengaged to its engaged position and said cover is maintained in its open position by its own weight and a second angular position in which said latching pawl means is moving from its engaged to its disengaged position and said cover is again maintained in its open position by its own weight.

2. The pressure vessel of claim 1, wherein said piston cylinder means comprise a pressure cylinder mounted to extend into said pressure vessel, a piston slidably mounted within said cylinder, and a piston rod coupling said piston to said cover inside said pressure vessel, said pressure cylinder, piston and piston rod being rotatable with said pressure vessel.

3. The pressure vessel of claim 2, further comprising pressure supply means connected for increasing the pressure inside said pressure vessel, and including means for directing a pressure medium to said pressure cylinder for operating said cover means.

4. The pressure vessel of claim 2, wherein said pressure cylinder comprises first opening means extending into said vessel, said first opening means being located in such a position that said piston uncovers the first opening means when the vessel is closed by the cover means to admit a pressure medium into the vessel in response to such closing, said cylinder comprising further opening means located in said cylinder in such a position that the piston uncovers the further opening means prior to the complete closing of the vessel for admitting some pressure into the vessel prior to closing of the vessel.

5. The pressure vessel of claim 4, wherein said cover, piston, and cylinder are mounted coaxially with respect to the longitudinal axis of said vessel.

6. The pressure vessel of claim 4, wherein said latching pawl means is mounted on the outside of said cylinder inside said vessel.

7. The pressure vessel of claim 1, wherein said pivot means pivotally mount said latching pawl means to said pressure cylinder, said pawl catch means comprising a latching shoulder movable with said piston rod, said latching pawl means being positioned to engage said latching shoulder.

8. The pressure vessel of claim 7, wherein said latching shoulder is connected to said cover means and spaced from the cover means.

9. The pressure vessel of claim 7, further comprising a second latching pawl means mounted axially symmetrically on said pressure cylinder with respect to said first mentioned latching pawl means, said second latching pawl means also being so weighted to engage said latching shoulder in response to the force of gravity in the same manner as said first mentioned latching pawl means.

10. The pressure vessel of claim 1, further comprising means for holding said latching pawl means in at least one of its positions.

11. The pressure vessel of claim 1, especially for peeling produce such as fruits or vegetables, further comprising means operatively connected to said pressure vessel for rotating the pressure vessel, said latching pawl means comprising a free end with a hook, whereby said latching pawl means have a center of gravity located between said free end hook and said pivot means.

12. The pressure vessel of claim 1, wherein said vessel has a longitudinal axis and a rotational axis extending substantially at right angles to each other, said rotational axis of the vessel extending at an angle of less than 45° relative to the horizontal, said pivot means defining a pivot axis for said latching pawl means, said pivot axis extending substantially in parallel to said rotational axis of said vessel, whereby said pivot axis also includes with the horizontal an angle of less than 45°.

13. The pressure vessel of claim 12, wherein the pivot axis of said latching pawl means extends tranversely to the cylinder.

14. The pressure vessel of claim 1, wherein said latching pawl means engage said pawl catch means in response to rotation of said vessel out of its vertical position and disengages the pawl catch means in response to the vessel's return into a vertical position.

15. The pressure vessel of claim 1, further comprising a layer of a relatively soft lining on the inner walls of said pressure vessel.

16. The pressure vessel of claim 1, wherein said pawl catch means hold said cover means open during a predetermined angular movement of said vessel.

17. The pressure vessel of claim 1, wherein said pawl catch means comprise means for locking said latching pawl means in its open position or in its cover arresting position.

18. The pressure vessel of claim 1, further comprising pressure inlet valve means for introducing a pressure medium into said pressure vessel, control means operatively connected to said inlet valve means and responsive to the cover arresting position of said latching pawl means for inhibiting the introduction of pressure medium into said pressure vessel when said latching pawl means is in its closed, cover arresting position, and for admitting pressure medium into said pressure vessel when said latching pawl means is in its open, cover releasing position.

* * * * *